(12) United States Patent
Weng et al.

(10) Patent No.: US 12,235,478 B2
(45) Date of Patent: Feb. 25, 2025

(54) OPTICAL ELEMENT DRIVING MECHANISM

(71) Applicant: TDK TAIWAN CORP., Taoyuan (TW)

(72) Inventors: Chih-Wei Weng, Taoyuan (TW);
Tzu-Ying Chen, Taoyuan (TW);
Chao-Hsi Wang, Taoyuan (TW);
Kuen-Wang Tsai, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 589 days.

(21) Appl. No.: 17/571,068

(22) Filed: Jan. 7, 2022

(65) Prior Publication Data

US 2022/0221625 A1    Jul. 14, 2022

Related U.S. Application Data

(60) Provisional application No. 63/135,402, filed on Jan. 8, 2021.

(51) Int. Cl.
| | |
|---|---|
| *G02B 5/30* | (2006.01) |
| *G02B 5/00* | (2006.01) |
| *G02B 7/00* | (2021.01) |
| *G02B 13/00* | (2006.01) |
| *G02B 26/02* | (2006.01) |
| *G03B 5/00* | (2021.01) |
| *G03B 30/00* | (2021.01) |

(52) U.S. Cl.
CPC .............. *G02B 5/30* (2013.01); *G02B 5/005* (2013.01); *G02B 7/005* (2013.01); *G02B 7/006* (2013.01); *G02B 13/0075* (2013.01); *G02B 26/023* (2013.01); *G03B 5/00* (2013.01); *G03B 30/00* (2021.01); *G02B 5/3025* (2013.01); *G03B 2205/0069* (2013.01)

(58) Field of Classification Search
CPC .......... G02B 5/30; G02B 7/005; G02B 7/006; G02B 5/3025
USPC ....................................................... 353/601
See application file for complete search history.

(56) References Cited

U.S. PATENT DOCUMENTS 3,881,815 A * 5/1975 McGourty ............... G09B 5/02
353/97

* cited by examiner

*Primary Examiner* — Jerry L Brooks
(74) *Attorney, Agent, or Firm* — MUNCY, GEISSLER, OLDS & LOWE, P.C.

(57) ABSTRACT

The present disclosure provides an optical element driving mechanism, which includes a movable part, a fixed assembly, and a driving assembly. The movable part is configured to be connected to an optical element. The fixed assembly has an opening for allowing a light beam along an optical axis to pass, and the movable part is movable relative to the fixed assembly. The driving assembly is configured to drive the movable part to move relative to the fixed assembly. The optical element driving mechanism further includes a recovery assembly configured to position the movable part in a first position when the movable part is not driven by the driving assembly.

20 Claims, 10 Drawing Sheets

OPTICAL ELEMENT DRIVING MECHANISM

CROSS REFERENCE TO RELATED APPLICATIONS

This application claims the benefit of U.S. Provisional Application No. 63/135,402, filed on Jan. 8, 2021, the entirety of which is incorporated by reference herein.

BACKGROUND OF THE DISCLOSURE

Field of the Disclosure

The present disclosure relates to an optical element driving mechanism, and in particular it relates to an optical element driving mechanism with an aperture structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a movable part, a fixed assembly, and a driving assembly. The movable part is configured to be connected to an optical element. The fixed assembly has an opening for allowing a light beam along an optical axis to pass, and the movable part is movable relative to the fixed assembly. The driving assembly is configured to drive the movable part to move relative to the fixed assembly. The optical element driving mechanism further includes a recovery assembly configured to position the movable part in a first position when the movable part is not driven by the driving assembly.

According to some embodiments, the optical element is movable relative to the movable part. The optical element is movable relative to the fixed assembly. When the driving assembly drives the movable part to move relative to the fixed assembly, the movable part drives the optical element to move relative to the fixed assembly, and motion mode of the movable part relative to the fixed assembly is different from motion mode of the optical element relative to the fixed assembly.

According to some embodiments, the optical element driving mechanism is configured to correspond to an optical module, and the light beam is incident on the optical module after passing through the optical element driving mechanism. The optical module includes a focus assembly configured to drive an optical assembly of the optical module to focus.

According to some embodiments, when the movable part is located in a second position relative to the fixed assembly, the optical element overlaps at least a part of the opening. When viewed along the optical axis and when the movable part is located in the first position, an overlapping area of the optical element and the opening is different from the overlapping area of the optical element and the opening when the movable part is located in the second position.

According to some embodiments, when viewed along the optical axis and when the movable part is located in the first position, the overlapping area of the optical element and the opening is less than the overlapping area of the optical element and the opening when the movable part is located in the second position. When the movable part is in the second position and is not driven by the driving assembly, the recovery assembly is configured to return the movable part from the second position to the first position.

According to some embodiments, the recovery assembly includes: a first fixed end, fixedly connected to the fixed assembly. A second fixed end, fixedly connected to the movable part; and an elastic portion, wherein the second fixed end is movably connected to the first fixed end via the elastic portion. The first fixed end is disposed on a protruding structure of the fixed assembly. The second fixed end is disposed on a receiving structure of the movable part.

According to some embodiments, when the movable part is located in the first position, the elastic portion generates a first deformation. When the movable part is located in the second position, the elastic portion generates a second deformation. A magnitude of the second deformation is different from a magnitude of the first deformation. The magnitude of the second deformation is greater than the magnitude of the first deformation. The recovery assembly has a plate-shaped structure.

According to some embodiments, when viewed along the optical axis, the fixed assembly with a polygonal structure includes: a first side, parallel to a first axis; a second side, parallel to a second axis; and a first corner, located between the first side and the second side.

According to some embodiments, the first axis is not parallel to the second axis. The first axis and the second axis are perpendicular to each other. When viewed along the optical axis, the recovery assembly is adjacent to the first corner.

According to some embodiments, the receiving structure of the movable part corresponds to the recovery assembly. The receiving structure has a recessed structure. When viewed along the optical axis, the movable part does not overlap the elastic portion.

According to some embodiments, the optical element driving mechanism further includes a restricting assembly configured to restrict the movable part to rotate within an extreme motion range relative to the fixed assembly. The extreme motion range is less than 90 degrees.

According to some embodiments, the restricting assembly includes: a protruding element, wherein the protruding element and the movable part are integrally formed, and the protruding element protrudes toward the fixed assembly; and a recessed portion, formed on the fixed assembly, corresponding to the protruding element and having a first blocking surface and a second blocking surface. An extending direction of the protruding element is far away from the center of the receiving structure.

According to some embodiments, when the movable part is located in a first extreme position relative to the fixed assembly, the protruding element directly contacts the first blocking surface. When the movable part is located in a second extreme position relative to the fixed assembly, the protruding element directly contacts the second blocking surface. An included angle between the first blocking surface and the second blocking surface is less than 90 degrees.

According to some embodiments, when viewed along the optical axis, a center of the recovery assembly and a center of the opening form a first connecting line, a center of the restricting assembly and the center of the opening form a second connecting line, and an included angle between the first connecting line and the second connecting line exceeds 90 degrees. When viewed along the optical axis, the included angle between the first connecting line and the second connecting line is not 180 degrees. When viewed along the optical axis, the restricting assembly is adjacent to a second corner of the fixed assembly. When viewed along the optical axis, a connecting line of the first corner and the second corner passes through the opening. When viewed in a direction perpendicular to the optical axis, the recovery assembly overlaps at least a part of the restricting assembly.

According to some embodiments, the driving assembly further includes: a first driving element, configured to generate a first driving force for the movable part; and a second driving element, configured to generate a second driving force for the movable part. When viewed along the optical axis, the first driving element is adjacent to a third corner of the fixed assembly. When viewed along the optical axis, a center of the first driving element and the center of the opening form a third connecting line, and an included angle formed between the first connecting line and the third connecting line is less than 90 degrees. When viewed along the optical axis, an included angle formed between the second connecting line and the third connecting line is greater than 90 degrees. When viewed along the optical axis, the included angle formed between the second connecting line and the third connecting line is less than 180 degrees.

According to some embodiments, when viewed along the optical axis, the second driving element is adjacent to a fourth corner of the fixed assembly. When viewed along the optical axis, a center of the second driving element and the center of the opening form a fourth connecting line, and an included angle formed between the first connecting line and the fourth connecting line is greater than 90 degrees. When viewed along the optical axis, the included angle formed between the first connecting line and the fourth connecting line is less than 180 degrees. When viewed along the optical axis, an included angle formed between the second connecting line and the fourth connecting line is less than 90 degrees.

According to some embodiments, the fixed assembly further includes: an outer frame; a frame, wherein the frame and the outer frame form a first accommodating space configured to accommodate the optical element; and a base, wherein the base and the frame form a second accommodating space configured to accommodate the driving assembly. The recovery assembly is located in the second accommodating space. The restricting assembly is located in the second accommodating space.

According to some embodiments, when viewed along a direction perpendicular to the optical axis, a protruding portion of the movable part overlaps at least a part of the frame. The outer frame has a guiding structure corresponding to the protruding portion. The guiding structure has a slotted structure. The protruding portion is exposed by the slotted structure. The protruding portion directly contacts the optical element. When viewed along the optical axis, the frame covers the recovery assembly. When viewed along the optical axis, the recovery assembly is not exposed from the frame.

According to some embodiments, the optical element diving mechanism further includes: a sensing assembly, configured to sense movement of the movable part and output a sensing signal; and a control assembly, configured to control the driving assembly according to the sensing signal, and the control assembly storing: first information, recording relationship data between the sensing signal and the overlapping area of the optical element and the opening. The first information is measured and calibrated by an external measuring device and then stored in the control assembly.

According to some embodiments, the control assembly is configured to control the movable part to be temporarily fixed in the first position, and then control the focus assembly to drive the optical assembly to focus, after that, the driving assembly drives the movable part to move so as to change the overlapping area of the optical element and the opening, and then activate a photoelectric converter of the optical module to convert the light beam into an electronic signal.

The present disclosure provides an optical element driving mechanism, including a movable part, a fixed assembly and a driving assembly. The driving assembly is configured to drive the movable part to move relative to the fixed assembly within the extreme motion range to drive the optical elements to move, thereby changing the overlapping area of the optical elements and the opening of the fixed assembly. Therefore, the optical element driving mechanism can adjust the size of the aperture according to different needs of users to optimize the captured images.

In addition, when the movable part is in any position within the extreme motion range and the driving assembly does not drive the movable part to move, the recovery assembly can provide an elastic force to return the movable part from other positions to the first position. Based on this design, the movable part can be quickly returned to the first position, and energy saving can also be achieved.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF TI-IE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1:
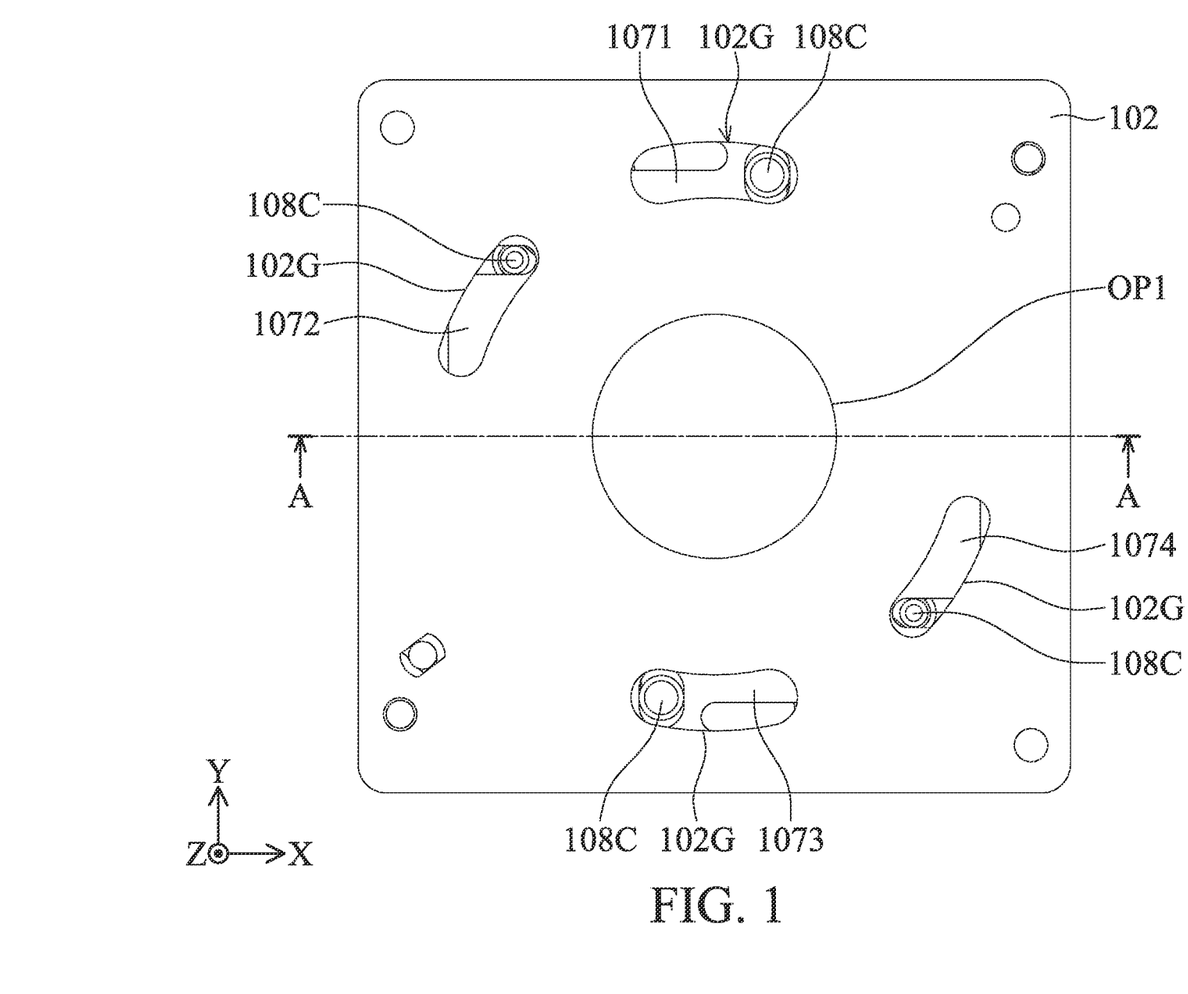
FIG. 1 shows a top view of an optical element driving mechanism 100 according to an embodiment of the present disclosure.
Figure 2:
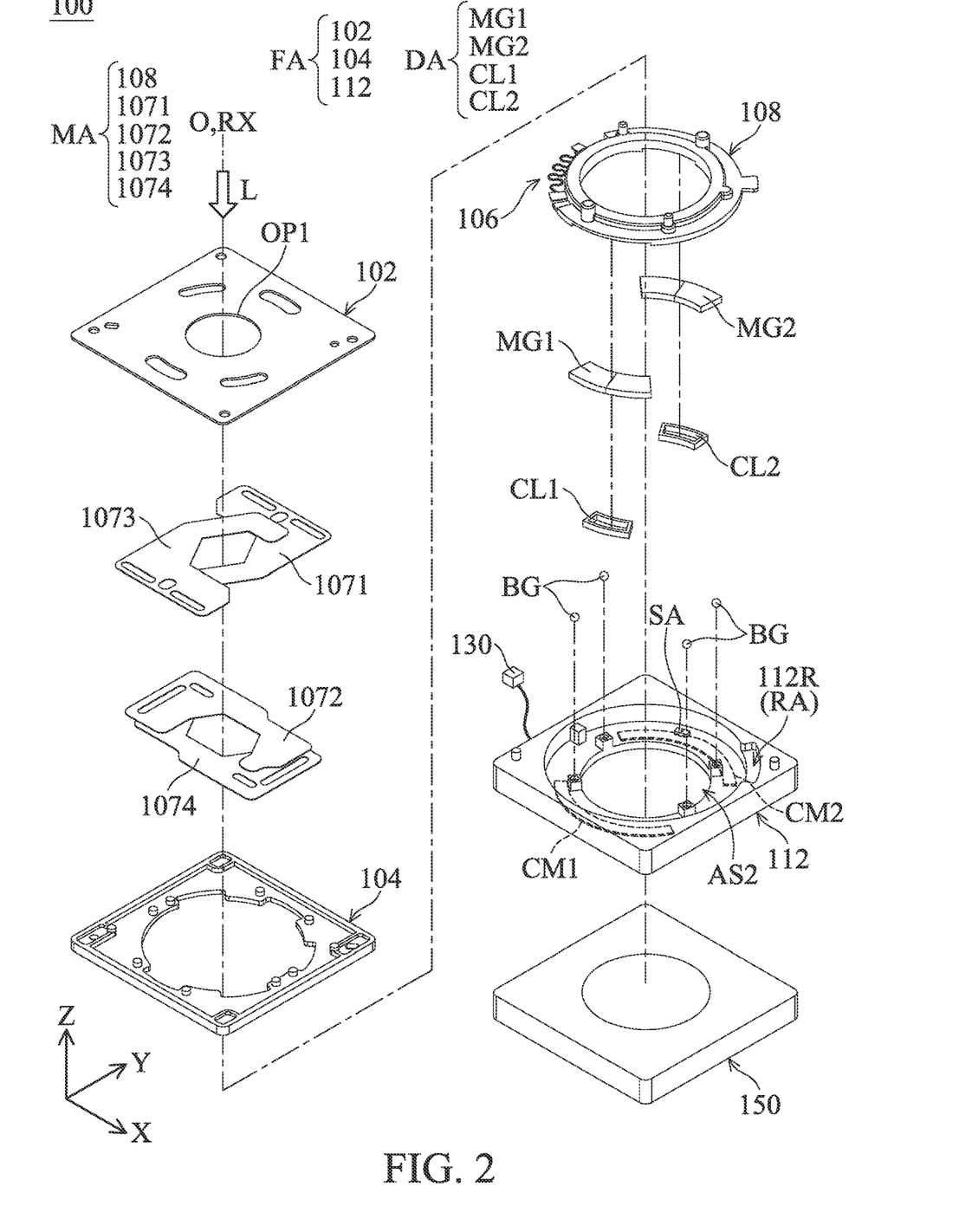
FIG. 2 shows an exploded diagram of the optical element driving mechanism 100 according to the embodiment of the present disclosure.
Figure 3:
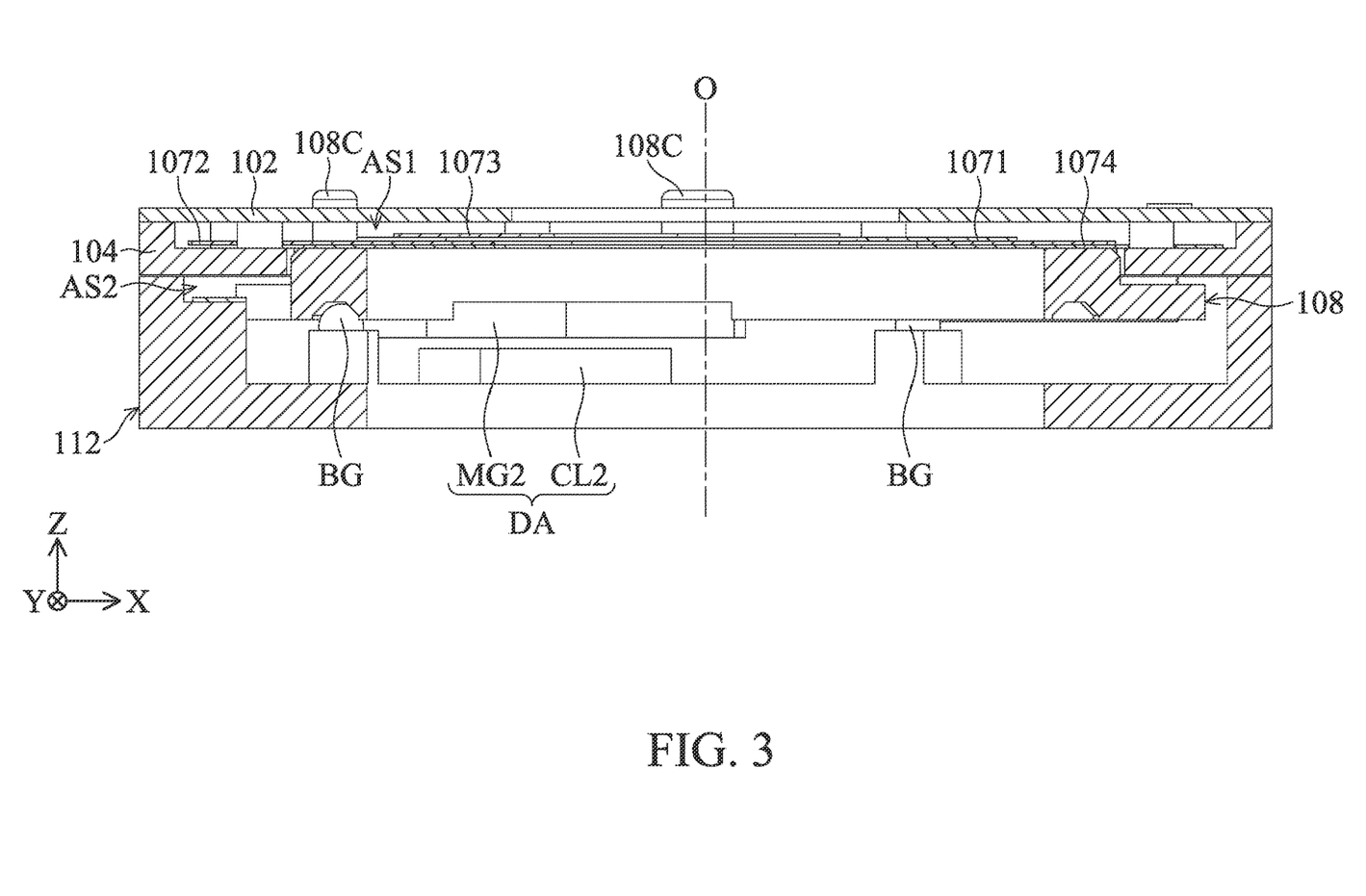
FIG. 3 shows a cross-sectional view of the optical element driving mechanism 100 along line A-A in FIG. 1 according to the embodiment of the present disclosure.

Please refer to FIG. 1 to FIG. 3. FIG. 1 shows a top view of an optical element driving mechanism 100 according to an embodiment of the present disclosure, FIG. 2 shows an exploded diagram of the optical element driving mechanism 100 according to the embodiment of the present disclosure, and FIG. 3 shows a cross-sectional view of the optical element driving mechanism 100 along line A-A in FIG. 1 according to the embodiment of the present disclosure. The optical element driving mechanism 100 can be an optical module and can be configured to hold and drive an optical element. The optical element driving mechanism 100 can be installed in different electronic devices or portable electronic devices, such as a smartphone, for allowing a user to perform the function of adjusting the amount of light.

In this embodiment, the optical element driving mechanism 100 may include a fixed assembly FA, a movable assembly MA, and a driving assembly DA. The movable assembly MA is movably connected to the fixed assembly FA. The driving assembly DA is configured to drive the movable assembly MA to move relative to the fixed assembly FA.

In this embodiment, as shown in FIG. 2 and FIG. 3, the fixed assembly FA includes an outer frame 102, a frame 104 and a base 112. The frame 104 and the outer frame 102 form a first accommodating space AST configured to accommodate a part of the movable assembly MA, and the base 112 and the frame 104 form a second accommodating space AS2 configured to accommodate the driving assembly DA.

The movable assembly MA may include a movable part 108 and optical elements 1071 to 1074, and the movable part 108 is configured to be connected to the optical elements 1071 to 1074. The movable part 108 is movable relative to the fixed assembly FA, and the driving assembly DA is configured to drive the movable part 108 and the optical elements 1071 to 1074 to move relative to the fixed assembly FA.

The optical elements 1071 to 1074 may each have a plate-shaped structure. In this embodiment, the optical elements 1071 to 1074 can be used as a light-shielding piece, but it is not limited thereto. The optical elements 1071 to 1074 are movable relative to the movable part 108, and the optical elements 1071 to 1074 are movable relative to the fixed assembly FA.

In this embodiment, the driving assembly DA may include a first coil CL1, a second coil CL2, a first magnetic element MG1 (the first driving element), a second magnetic element (the second driving element), a first magnetically conductive element CM1 and a second magnetically conductive element CM2. The first coil CL1 corresponds to the first magnetic element MG1, the second coil CL2 corresponds to the second magnetic element MG2, the first magnetically conductive element CM1 corresponds to the first coil CL1, and the second magnetically conductive element CM2 corresponds to the second coil CL2.

The first magnetic element MG1 and the second magnetic element MG2 are fixedly disposed on the bottom of the movable part 108 and respectively act with the first coil CL1 and the second coil CL2 to generate a first driving force and a second driving force to drive the movable part 108 to rotate around a rotating axis RX.

Furthermore, the optical element driving mechanism 100 further includes more than three rolling elements BG, such as balls, disposed between the movable part 108 and the base 112, so that the movable part 108 can rotate smoothly with respect to the base 112.

In this embodiment, when the driving assembly DA drives the movable part 108 to move relative to the fixed assembly FA, the movable part 108 drives the optical elements 1071 to 1074 to move relative to the fixed assembly FA and the motion mode of the movable part 108 relative to the fixed assembly FA is different from the motion mode of optical elements 1071 to 1074 relative to fixed assembly FA. For example, the movement of the movable part 108 is a rotational movement, and the movement of the optical elements 1071 to 1074 is a translational movement.

As shown in FIG. 2, the fixed assembly FA has an opening OP1 for allowing a light beam L traveling along an optical axis O to pass. The optical element driving mechanism 100 is configured to correspond to an optical module 150, and the light beam L is incident on the optical module 150 after passing through the optical element driving mechanism 100. The optical module 150 generates a digital image signal after receiving the light beam L.

Furthermore, in this embodiment, the optical module 150 may include a focus assembly (not shown in the figures). For example, the focus assembly may be a voice coil motor, configured to drive an optical assembly (the optical lenses) of the optical nodule 150 for focusing.

Figure 4:
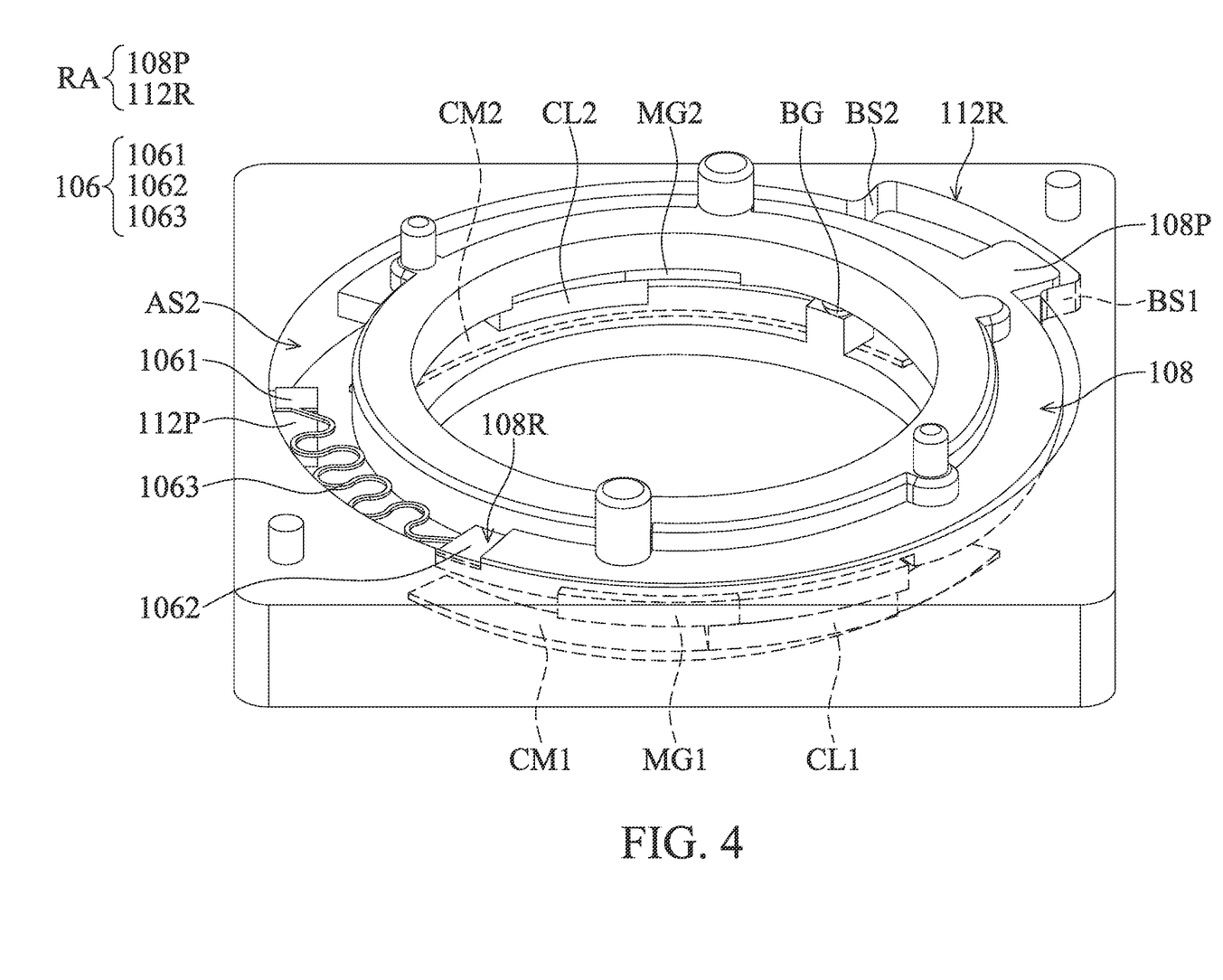
FIG. 4 is a perspective view of a partial structure of the optical element driving mechanism 100 according to an embodiment of the present disclosure.

Please refer to FIG. 2 and FIG. 4. FIG. 4 is a perspective view of a partial structure of the optical element driving mechanism 100 according to an embodiment of the present disclosure. In this embodiment, the optical element driving mechanism 100 may further include a recovery assembly 106 configured to locate the movable part 108 in a first position (the position in FIG. 1 and FIG. 4) when the movable part 108 is not driven by the driving assembly DA. The recovery assembly 106 is located in the second accommodating space AS2.

The recovery assembly 106 includes a first fixed end 1061, a second fixed end 1062 and an elastic portion 1063. The first fixed end 1061 is fixedly connected to the fixed assembly FA, the second fixed end 1062 is fixedly connected to the movable part 108, and the second fixed end 1062 is movably connected to the first fixed end 1061 via an elastic portion 1063.

Specifically, the first fixed end 1061 is disposed on a protruding structure 112P of the fixed assembly FA, and the second fixed end 1062 is disposed on a receiving structure 108R of the movable part 108. In this embodiment, the first fixed end 1061 and the second fixed end 1062 of the recovery assembly 106 have a plate-shaped structure, but it is not limited thereto.

Figure 5:
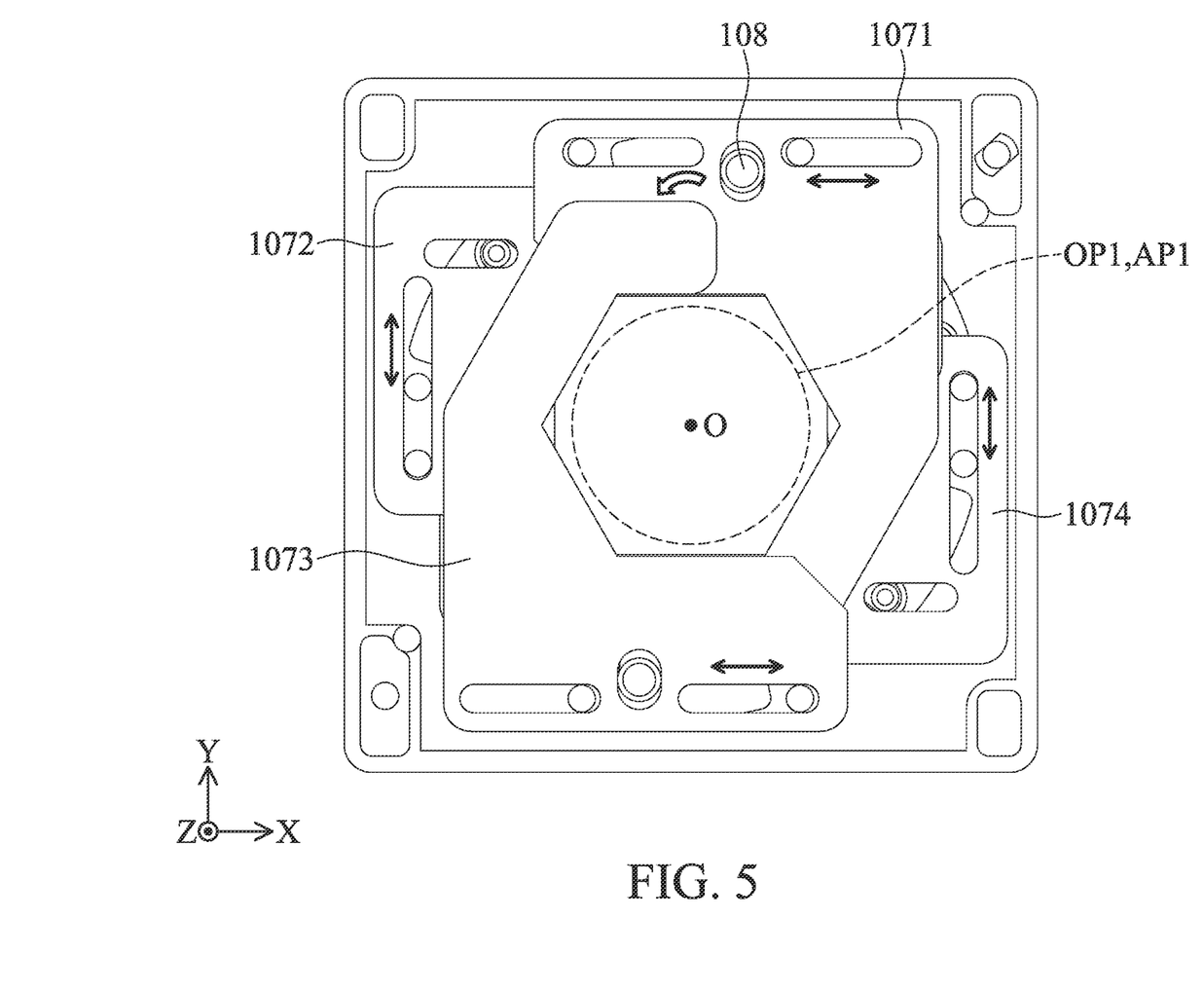
FIG. 5 is a top view of a partial structure of the optical element driving mechanism 100 according to an embodiment of the present disclosure.
Figure 6:
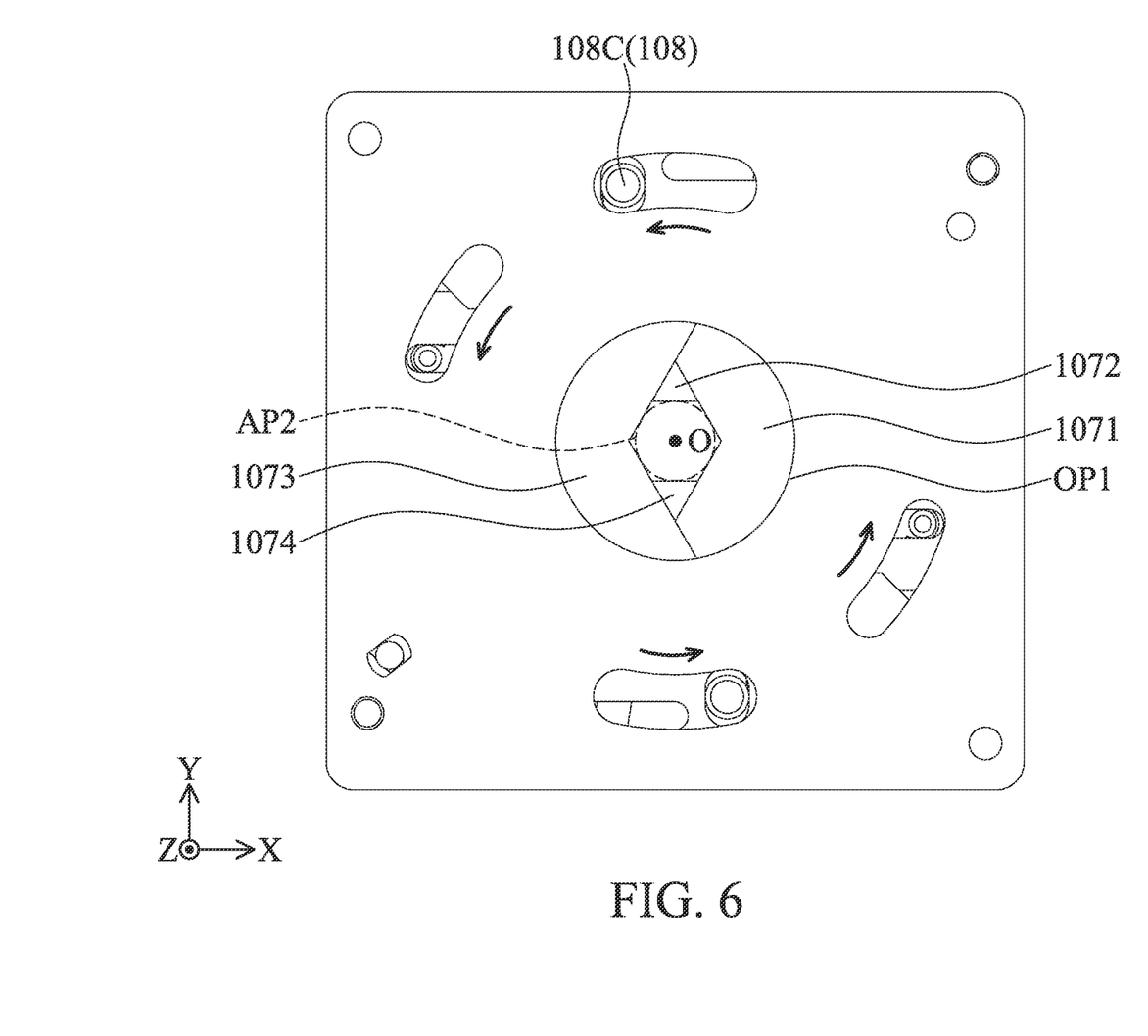
FIG. 6 is a top view illustrating that the movable part 108 of the optical element driving mechanism 100 is located in a second position according to an embodiment of the present disclosure.
Figure 7:
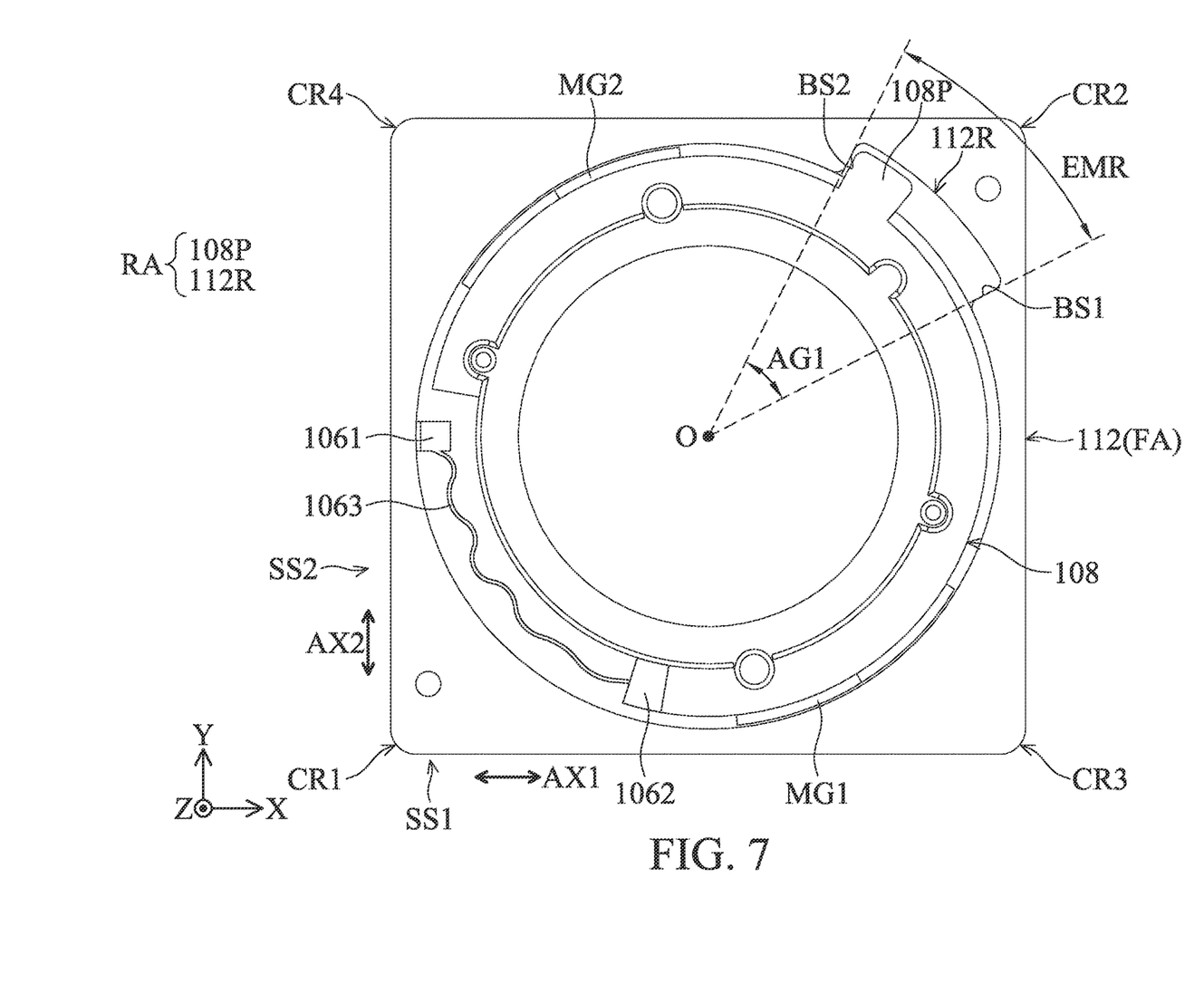
FIG. 7 is a top view of a partial structure of the optical element driving mechanism 100 according to an embodiment of the present disclosure.

Please refer to FIG. 4 to FIG. 7. FIG. 5 is a top view of a partial structure of the optical element driving mechanism 100 according to an embodiment of the present disclosure, FIG. 6 is a top view illustrating that the movable part 108 of the optical element driving mechanism 100 is located in a second position according to an embodiment of the present disclosure, and FIG. 7 is a top view of a partial structure of the optical element driving mechanism 100 according to an embodiment of the present disclosure. In this embodiment, as shown in FIG. 5, when the movable part 108 is driven to rotate, the optical elements 1071 and 1073 translate along the X-axis, and the optical elements 1072 and 1074 translate along the Y-axis.

As shown in FIG. 6, when the movable part 108 is located in the second position relative to the fixed assembly FA, the optical elements 1071 to 1074 overlap at least a part of the opening OP1. Furthermore, when viewed along the optical axis O and when the movable part 108 is in the first position (FIG. 5), the overlapping area of the optical elements 1071 to 1074 and the opening OP1 is different from the overlapping area of the optical elements 1071 to 1074 and the opening OP1 when the movable part 108 is in the second position.

Specifically, when viewed along the optical axis O and when the movable part 108 is located in the first position, the overlapping area of the optical elements 1071 to 1074 and the opening OP1 is less than the overlapping area of the optical elements 1071 to 1074 and the opening OP1 when the movable part 108 is in the second position. That is, when the movable part 108 is located in the first position, the size of a first aperture AP1 of the optical element driving mechanism 100 is equal to the size of the opening OP1. When the movable part 108 is located in the second position, the size of a second aperture AP2 of the optical element driving mechanism 100 is smaller than the size of the first aperture AP1.

In addition, it is worth noting that when the movable part 108 is in the second position (FIG. 7) and is not driven by the driving assembly DA, the recovery assembly 106 is configured to return the movable part 108 from the second position to the first position. For example, the elastic portion 1063 of the recovery assembly 106 can be made of elastic material. That is, the recovery assembly 106 can be a spring, configured to provide an elastic force, so that the movable part 108 can return from the second position to the first position.

When the movable part 108 is located in the first position, the elastic portion 1063 generates a first deformation (or no deformation). When the movable part 108 is located in the second position, the elastic portion 1063 generates a second deformation. In this embodiment, the magnitude of the second deformation is different from the magnitude of the first deformation. For example, as shown in FIG. 7 and FIG. 4, the magnitude of the second deformation is greater than the magnitude of the first deformation.

As shown in FIG. 7, when viewed along the optical axis O, the fixed assembly FA with a polygonal structure further includes a first side SS1, a second side SS2 and a first corner CR1. The first side SS1 is parallel to a first axis AX1, the second side SS2 is parallel to a second axis AX2, and the first corner CR1 is located between the first side SS1 and the second side SS2.

The first axis AX1 is not parallel to the second axis AX2. For example, the first axis AX1 and the second axis AX2 are perpendicular to each other. As shown in FIG. 7, when viewed along the optical axis O, the recovery assembly 106 is adjacent to the first corner CR1.

As shown in FIG. 4 and FIG. 7, the receiving structure 108R of the movable part 108 corresponds to the recovery assembly 106. The receiving structure 108R has a recessed structure, and when viewed along the optical axis O, the movable part 108 does not overlap the elastic portion 1063.

Furthermore, the optical element driving mechanism 100 further includes a restricting assembly RA configured to restrict the movable part 108 to rotate within an extreme motion range EMR relative to the fixed assembly FA. In this embodiment, the extreme motion range EMR is less than 90 degrees.

The restricting assembly RA is located in the second accommodating space AS2, and the restricting assembly RA includes a protruding element 108P and a recessed portion 112R. The protruding element 108P and the movable part 108 are integrally formed, and the protruding element 108P protrudes toward the base 112 of the fixed assembly FA. The extending direction of the protruding element 108P is far away from the center of receiving structure 108R.

The recessed portion 112S is formed on the base 112 of the fixed assembly FA, corresponding to the protruding element 108P, and the recessed portion 112S has a first blocking surface BS1 and a second blocking surface BS2. When the movable part 108 is located in a first extreme position relative to the fixed assembly FA, the protruding element 108P directly contacts the first blocking surface BS1. When the movable part 108 is in a second extreme position relative to the fixed assembly FA, the protruding element 108P directly contacts the second blocking surface BS2. As shown in FIG. 7, an included angle AG1 between the first blocking surface BS1 and the second blocking surface BS2 is less than 90 degrees.

Figure 8:
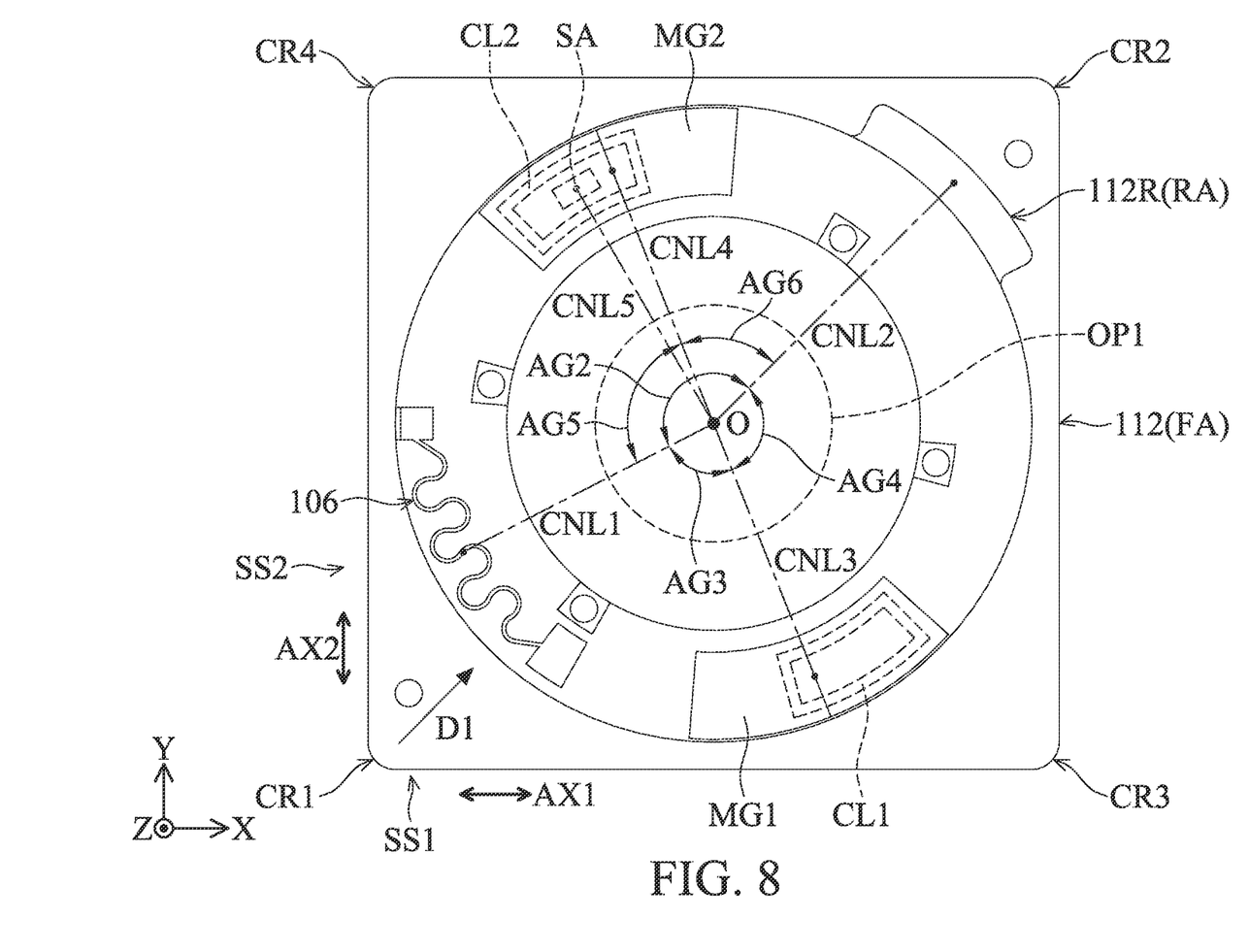
FIG. 8 is a top view of a partial structure of the optical element driving mechanism 100 according to an embodiment of the present disclosure.

Please refer to FIG. 8, which is a top view of a partial structure of the optical element driving mechanism 100 according to an embodiment of the present disclosure. When viewed along the optical axis O, the center of the recovery assembly 106 and the center of the opening OP1 form a first connecting line CNL1, and the center of the restricting assembly RA and the center of the opening OP1 form a second connecting line CNL2. An included angle AG2 between the first connecting line CNL1 and the second connecting line CNL2 exceeds 90 degrees. When viewed along the optical axis O, the included angle AG2 between the first connecting line CNL1 and the second connecting line CNL2 is not 180 degrees.

When viewed along the optical axis O, the restricting assembly RA is adjacent to a second corner CR2 of the fixed assembly FA. When viewed along the optical axis O, the connecting line of the first corner CR1 and the second corner CR2 passes through the opening OP1. When viewed in a direction perpendicular to the optical axis O (such as a first direction D1 in FIG. 8), the recovery assembly 106 overlaps at least a part of the restricting assembly RA.

When viewed along the optical axis O, the first driving element (the first magnetic element MG1) is adjacent to a third corner CR3 of the fixed assembly FA. When viewed along the optical axis O, the center of the first driving element (the first magnetic element MG1) and the center of the opening OP1 form a third connecting line CNL3, and an included angle AG3 between the first connecting line CNL1 and the third connecting line CNL3 is less than 90 degrees.

When viewed along the optical axis O, an included angle AG4 formed between the second connecting line CNL2 and the third connecting line CNL3 is greater than 90 degrees. When viewed along the optical axis O, the included angle AG4 formed between the second connecting line CNL2 and the third connecting line CNL3 is less than 180 degrees.

When viewed along the optical axis O, the second driving element (the second magnetic element MG2) is adjacent to a fourth corner CR4 of the fixed assemblies FA. When viewed along the optical axis O, the center of the second driving element (the second magnetic element MG2) and the center of the opening OP1 form a fourth connecting line CNL4, and an included angle AG5 between the first connecting line CNL1 and the fourth connecting line CNL4 is greater than 90 degrees.

When viewed along the optical axis O, the included angle AG5 formed between the first connecting line CNL1 and the fourth connecting line CNL4 is less than 180 degrees. When viewed along the optical axis O, an included angle AG5 formed between the second connecting line CNL2 and the fourth connecting line CNL4 is less than 90 degrees.

In addition, when viewed along the optical axis O, the center of the second coil CL2 and the center of the opening OP1 form a fifth connecting line CNL5, and the included angle between the second connecting line CNL2 and the fifth connecting line CNL5 is also less than 90 degrees.

Figure 9:
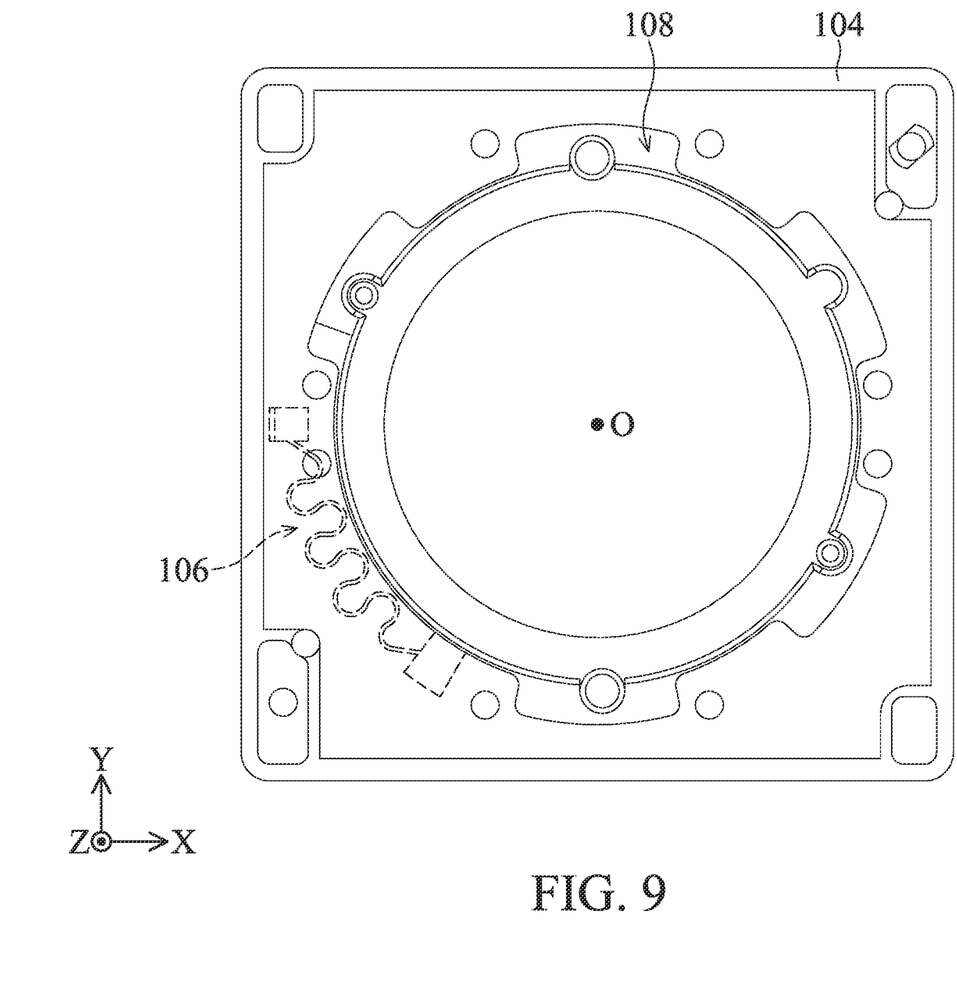
FIG. 9 is a top view of a partial structure of the optical element driving mechanism 100 according to an embodiment of the present disclosure.

Please refer to FIG. 1, FIG. 3, and FIG. 9. FIG. 9 is a top view of a partial structure of the optical element driving mechanism 100 according to an embodiment of the present disclosure. As shown in FIG. 3, when viewed in a direction perpendicular to the optical axis O, one or more protruding portions 108C of the movable part 108 overlap at least a part of the frame 104. As shown in FIG. 1, the outer frame 102 has a plurality of guiding structures 102G corresponding to a plurality of protruding portions 108O, respectively. The guiding structure 102G has a slotted structure, and the protruding portion 108C is exposed by the corresponding slotted structure. These protruding portions 108C are in direct contact with the optical elements 1071 to 1074 to drive the optical elements 1071 to 1074 to move.

In addition, as shown in FIG. 9, when viewed along the optical axis O, the frame 104 covers the recovery assembly 106. When viewed along the optical axis O, the recovery assembly 106 is not exposed from the frame 104. Based on this design, it can be ensured that the recovery assembly 106 does not affect the movement of the optical elements 1071 to 1074.

Furthermore, as shown in FIG. 2 and FIG. 8, the optical element driving mechanism 100 further includes a sensing assembly SA and a control assembly 130. The sensing assembly SA is configured to sense the movement of the movable part 108 and output a sensing signal, and the control assembly 130 is configured to control the driving assembly DA according to the sensing signal.

The control assembly 130 stores first information, which records the relationship data between the sensing signal and the overlapping area of the optical elements 1071 to 1074 and the opening OP1. The sensing signal may correspond to a voltage change, a current change, or other types of signal changes when the movable part 108 (or optical elements) is located in different positions.

It should be noted that the first information is measured and calibrated by an external measuring device and then stored in the control assembly 130.

In this embodiment, the control assembly 130 is configured to control the movable part 108 to be temporarily fixed in the first position (FIG. 1), and then control the focus assembly of the optical module 150 drive the optical assembly to focus. After that, the control assembly 130 controls the driving assembly DA to drive the movable part 108 to move so as to change the overlapping area of the optical elements 1071 to 1074 and the opening CPI (for example, FIG. 6), and then activate a photoelectric converter of the optical module 150 to convert the light beam into an electronic signal (such as capturing image).

Figure 10:
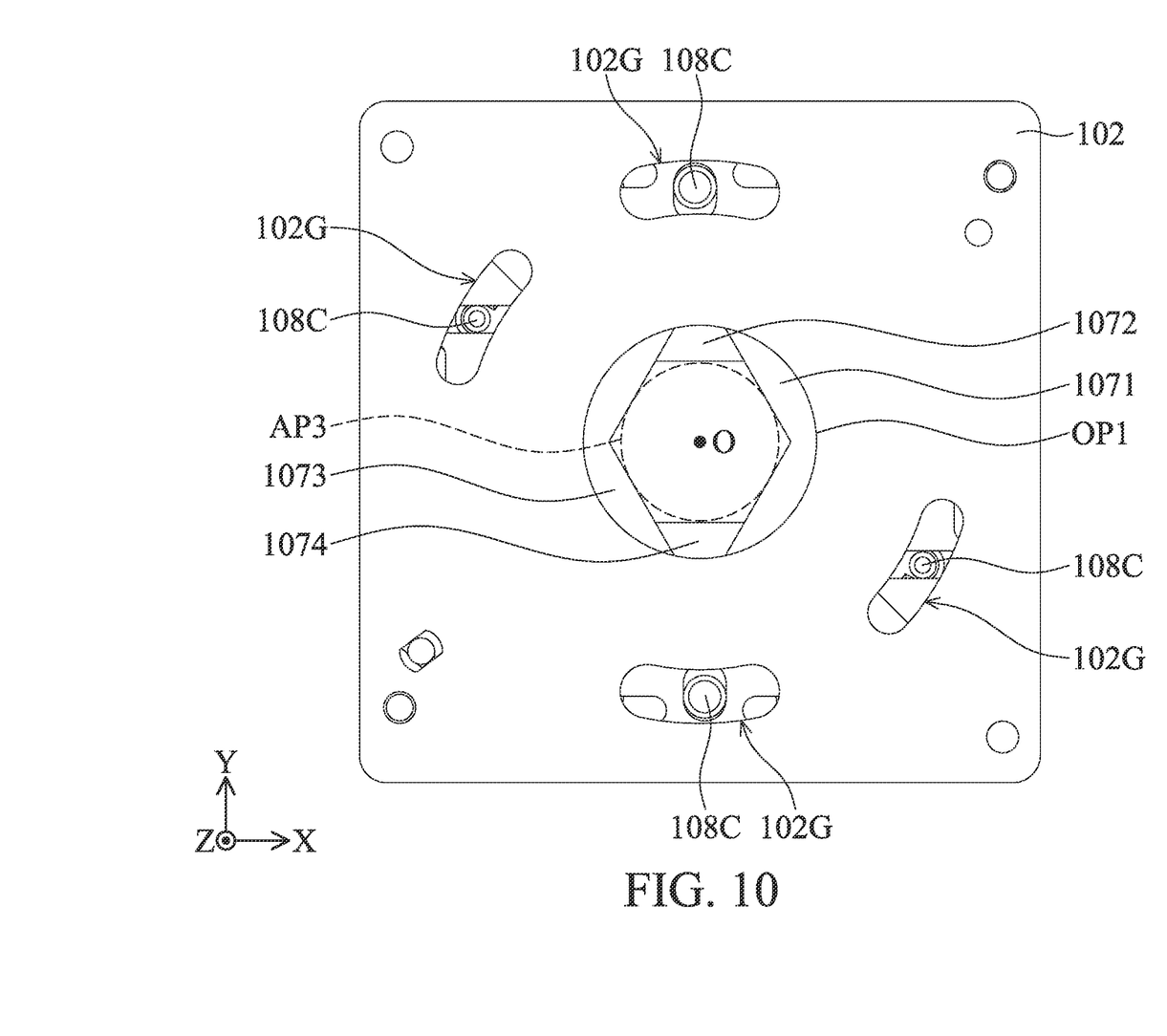
FIG. 10 is a top view of the movable part 108 in another position according to an embodiment of the present disclosure.

Please refer to FIG. 10, which is a top vie r of the movable part 108 in another position according to an embodiment of the present disclosure. In this embodiment, the driving assembly DA drives the movable part 108 to move to the position in FIG. 10 (another second position), so that the overlapping area of the optical elements 1071 to 1074 and the opening OPT is different from that in FIG. 1 or FIG. 6. That is, at this time, the size of a third aperture AP3 of the optical element driving mechanism 100 is different from the sizes of the first aperture AP1 and the second aperture AP2. Therefore, the optical element driving mechanism 100 can adjust the size of the aperture according to different needs of users to optimize the captured images.

In summary, the present disclosure provides an optical element driving mechanism, including a movable part 108, a fixed assembly FA and a driving assembly DA. The driving assembly DA is configured to drive the movable part 108 to move relative to the fixed assembly FA within the extreme motion range EMR to drive the optical elements 1071 to 1074 to move, thereby changing the overlapping area of the optical elements 1071 to 1074 and the opening OPT of the fixed assembly FA. Therefore, the optical element driving mechanism 100 can adjust the size of the aperture according to different needs of users to optimize the captured images.

In addition, when the movable part 108 is in any position within the extreme motion range EMIR and the driving assembly DA does not drive the movable part 108 to move, the recovery assembly 106 can provide an elastic force to return the movable part 108 from other positions to the first position. Based on this design, the movable part 108 can be quickly returned to the first position, and energy saving can also be achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure; processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising: a movable part, configured to be connected to an optical element; a fixed assembly, having an opening for allowing a light beam along an optical axis to pass, wherein the movable part is movable relative to the fixed assembly; a driving assembly, configured to drive the movable part to move relative to the fixed assembly; wherein the optical element driving mechanism further includes a recovery assembly configured to position the movable part in a first position when the movable part is not driven by the driving assembly, wherein the optical element is movable relative to the movable part; the optical element is movable relative to the fixed assembly.

2. The optical element driving mechanism as claimed in claim 1, wherein
when the driving assembly drives the movable part to move relative to the fixed assembly, the movable part drives the optical element to move relative to the fixed assembly, and motion mode of the movable part relative to the fixed assembly is different from motion mode of the optical element relative to the fixed assembly.

3. The optical element driving mechanism as claimed in claim 2, wherein
the optical element driving mechanism is configured to correspond to an optical module, and the light beam is incident on the optical module after passing through the optical element driving mechanism;
the optical module includes a focus assembly configured to drive an optical assembly of the optical module to focus.

4. The optical element driving mechanism as claimed in claim 3, wherein when the movable part is located in a second position relative to the fixed assembly, the optical element overlaps at least a part of the opening;
when viewed along the optical axis and when the movable part is located in the first position, an overlapping area of the optical element and the opening is different from the overlapping area of the optical element and the opening when the movable part is located in the second position.

5. The optical element driving mechanism as claimed in claim 4, wherein
when viewed along the optical axis and when the movable part is located in the first position, the overlapping area of the optical element and the opening is less than the overlapping area of the optical element and the opening when the movable part is located in the second position;
when the movable part is in the second position and is not driven by the driving assembly, the recovery assembly is configured to return the movable part from the second position to the first position.

6. The optical element driving mechanism as claimed in claim 5, wherein the recovery assembly includes:
a first fixed end, fixedly connected to the fixed assembly;
a second fixed end, fixedly connected to the movable part; and
an elastic portion, wherein the second fixed end is movably connected to the first fixed end via the elastic portion;
the first fixed end is disposed on a protruding structure of the fixed assembly;
the second fixed end is disposed on a receiving structure of the movable part.

7. The optical element driving mechanism as claimed in claim 6, wherein
when the movable part is located in the first position, the elastic portion generates a first deformation;
when the movable part is located in the second position, the elastic portion generates a second deformation;
a magnitude of the second deformation is different from a magnitude of the first deformation;
the magnitude of the second deformation is greater than the magnitude of the first deformation;
the recovery assembly has a plate-shaped structure.

8. The optical element driving mechanism as claimed in claim 7, wherein when viewed along the optical axis, the fixed assembly with a polygonal structure includes:
a first side, parallel to a first axis;
a second side, parallel to a second axis; and
a first corner, located between the first side and the second side.

9. The optical element driving mechanism as claimed in claim 8, wherein
the first axis is not parallel to the second axis;
the first axis and the second axis are perpendicular to each other;
when viewed along the optical axis, the recovery assembly is adjacent to the first corner.

10. The optical element driving mechanism as claimed in claim 9, wherein the receiving structure of the movable part corresponds to the recovery assembly;
the receiving structure has a recessed structure;
when viewed along the optical axis, the movable part does not overlap the elastic portion.

11. The optical element driving mechanism as claimed in claim 10, wherein the optical element driving mechanism further includes a restricting assembly configured to restrict the movable part to rotate within an extreme motion range relative to the fixed assembly;
the extreme motion range is less than 90 degrees.

12. The optical element driving mechanism as claimed in claim 11, wherein the restricting assembly includes:
a protruding element, wherein the protruding element and the movable part are integrally formed, and the protruding element protrudes toward the fixed assembly; and
a recessed portion, formed on the fixed assembly, corresponding to the protruding element and having a first blocking surface and a second blocking surface;
an extending direction of the protruding element is far away from the center of the receiving structure.

13. The optical element driving mechanism as claimed in claim 12, wherein
when the movable part is located in a first extreme position relative to the fixed assembly, the protruding element directly contacts the first blocking surface;
when the movable part is located in a second extreme position relative to the fixed assembly, the protruding element directly contacts the second blocking surface;
an included angle between the first blocking surface and the second blocking surface is less than 90 degrees.

14. The optical element driving mechanism as claimed in claim 13, wherein
when viewed along the optical axis, a center of the recovery assembly and a center of the opening form a first connecting line, a center of the restricting assembly and the center of the opening form a second connecting line, and an included angle between the first connecting line and the second connecting line exceeds 90 degrees;
when viewed along the optical axis, the included angle between the first connecting line and the second connecting line is not 180 degrees;
when viewed along the optical axis, the restricting assembly is adjacent to a second corner of the fixed assembly;
when viewed along the optical axis, a connecting line of the first corner and the second corner passes through the opening;
when viewed in a direction perpendicular to the optical axis, the recovery assembly overlaps at least a part of the restricting assembly.

15. The optical element driving mechanism as claimed in claim 14, wherein the driving assembly further includes:
a first driving element, configured to generate a first driving force for the movable part; and
a second driving element, configured to generate a second driving force for the movable part;
when viewed along the optical axis, the first driving element is adjacent to a third corner of the fixed assembly;
when viewed along the optical axis, a center of the first driving element and the center of the opening form a third connecting line, and an included angle formed between the first connecting line and the third connecting line is less than 90 degrees;

when viewed along the optical axis, an included angle formed between the second connecting line and the third connecting line is greater than 90 degrees;
when viewed along the optical axis, the included angle formed between the second connecting line and the third connecting line is less than 180 degrees.

16. The optical element driving mechanism as claimed in claim 15, wherein
when viewed along the optical axis, the second driving element is adjacent to a fourth corner of the fixed assembly;
when viewed along the optical axis, a center of the second driving element and the center of the opening form a fourth connecting line, and an included angle formed between the first connecting line and the fourth connecting line is greater than 90 degrees;
when viewed along the optical axis, the included angle formed between the first connecting line and the fourth connecting line is less than 180 degrees;
when viewed along the optical axis, an included angle formed between the second connecting line and the fourth connecting line is less than 90 degrees.

17. The optical element driving mechanism as claimed in claim 16, wherein the fixed assembly further includes:
an outer frame;
a frame, wherein the frame and the outer frame form a first accommodating space configured to accommodate the optical element; and
a base, wherein the base and the frame form a second accommodating space configured to accommodate the driving assembly;
the recovery assembly is located in the second accommodating space;
the restricting assembly is located in the second accommodating space.

18. The optical element driving mechanism as claimed in claim 17, wherein
when viewed along a direction perpendicular to the optical axis, a protruding portion of the movable part overlaps at least a part of the frame;
the outer frame has a guiding structure corresponding to the protruding portion;
the guiding structure has a slotted structure;
the protruding portion is exposed by the slotted structure;
the protruding portion directly contacts the optical element;
when viewed along the optical axis, the frame covers the recovery assembly;
when viewed along the optical axis, the recovery assembly is not exposed from the frame.

19. The optical element driving mechanism as claimed in claim 18, wherein the optical element driving mechanism further includes:
a sensing assembly, configured to sense movement of the movable part and output a sensing signal; and
a control assembly, configured to control the driving assembly according to the sensing signal, and the control assembly storing:
first information, recording relationship data between the sensing signal and the overlapping area of the optical element and the opening;
the first information is measured and calibrated by an external measuring device and then stored in the control assembly.

20. The optical element driving mechanism as claimed in claim 19, wherein the control assembly is configured to control the movable part to be temporarily fixed in the first position, and then control the focus assembly to drive the optical assembly to focus, after that, the driving assembly drives the movable part to move so as to change the overlapping area of the optical element and the opening, and then activate a photoelectric converter of the optical module to convert the light beam into an electronic signal.

* * * * *